March 3, 1936.  K. SCHWARZ  2,032,444
SPEED REGULATION
Filed April 1, 1935
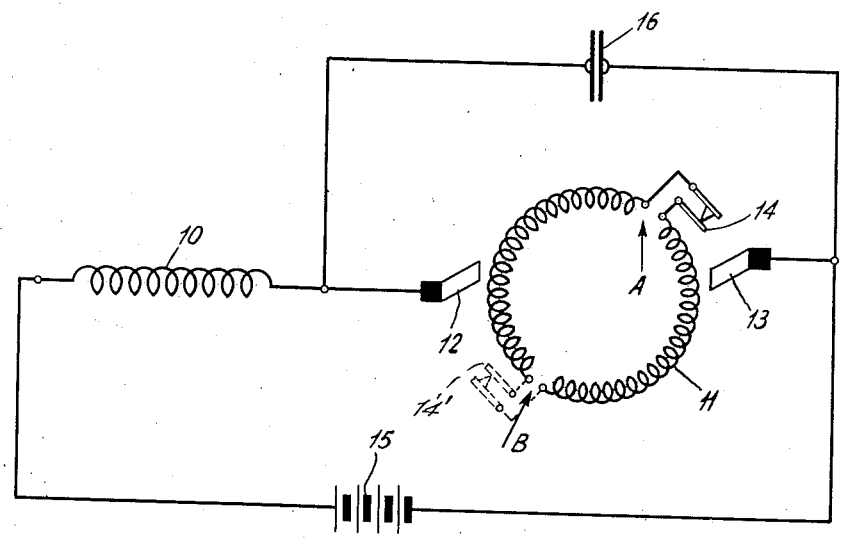
INVENTOR
KARL SCHWARZ
BY
ATTORNEY Patented Mar. 3, 1936

2,032,444

UNITED STATES PATENT OFFICE 2,032,444

SPEED REGULATION

Karl Schwarz, Berlin, Germany, assignor to Klangfilm G. m. b. H., Berlin, Germany, a corporation of Germany Application April 1, 1935, Serial No. 14,065
In Germany July 18, 1934

3 Claims. (Cl. 171—222)

This invention relates to the speed regulation of commutator motors of the alternating or direct current type, and has for its principal object the provision of an improved apparatus and method of operation whereby the driving speed of a photographic sound recorder or the like may be maintained substantially constant with relatively low consumption of power.

For regulating the speed of D. C. and A. C. commutator motors, it is known from the prior art to use centrifugally operated switches which are connected, for instance, in parallel relation to the field winding and which were mounted on the armature, the current to be made or broken being fed thereto by way of slip rings. However, slip rings of this kind, especially where very small motors are involved, consume a disproportionally large part of the motor power, not to mention the fact that speed control is not feasible without the incurrence of losses, and this, at least in cases where the motor is to drive a sound-film recording machine, constitutes a serious shortcoming on the ground that the requisite energy must be carried along in the form of storage batteries.

The present invention has for its object the provision of an improved D. C. and A. C. commutator motor control system which involves the use of centrifugally operated contacts but is free from the aforesaid difficulties. In accordance with this invention, the armature windings at two places diametrically opposite to each other are broken or opened up so that at one or both these places a centrifugal switch may be inserted.

An exemplified embodiment of the invention is described in the following by reference to the attached drawing, the single figure of which shows the same in schematic form.

10 denotes the field winding of a D. C. commutator motor of the series-wound type, 11 is an armature winding. The commutator brushes 12, 13 are shown for the sake of simplicity as being in sliding contact with the armature winding proper. The armature winding is broken at points marked A and B, and a centrifugally operated switch 14 is inserted at A. The energy for feeding the motor is furnished from battery 15 or other suitable source.

Speed control is insured by that, upon a prearranged speed of rotation being exceeded, the switch 14 responding to the effect of centrifugal force is caused to open with the result that both parallel branch circuits in the armature are interrupted. Hence, the armature is then energized so that its speed of rotation will fall off, the contact 14 becoming closed again automatically in response to the decrease in centrifugal force. This cycle of operation occurs repeatedly. If the armature winding 11 were merely opened up at the point A, the result would be that by the opening of contact 14 merely the ohm resistance of the armature would be raised to twice the value which it has when the contacts 14 are closed; but no marked regulator effect would be brought about. In fact, it is only when the armature is opened not only at point A, but also at point B placed diametrically opposite, that the opening and closing of the contact 14 results in an effective speed control.

It is possible to dispose at point B a centrifugal switch 14' similar to the switch 14 in which case, however, care must be taken to see the weights or masses of the mobile contact members, and the counteracting springs of the said contact members or halves are so dimensioned that the contacts will simultaneously open and close.

To avoid over-voltages incidental to the opening and closing of the contacts, it is preferable to provide a condenser 16, say, in a circuit as shown in the drawing. A condenser of this kind tends to diminish the over-voltage liable to be set up on opening the contacts 14 due to the fact that the magnetic field of the exciting winding 10, on opening the contacts 14, is conducive to the creation of a definite quantity of electricity which will charge the condenser 16 to a voltage which will be so much lower, the higher the capacity of the condenser. Omitting the said condenser 16, however, the vanishingly small capacity of the contacts 14 will be charged to a correspondingly far higher voltage, and this prevents the speedy quenching or suppression of the spark set up upon opening the circuit. The condenser 16 is not indispensable in order to take up the energy of the magnetic field of the armature winding 11 inasmuch as the same is not appreciable in contrast with the field energy of the exciting winding.

Having thus described my invention, I claim:

1. The combination of a commutator motor including field and armature windings, and means operable to separate opposed sections of said armature winding in response to a predetermined speed of said motor.

2. The combination of a commutator motor including field and armature windings, means operable to separate opposed sections of said armature winding in response to a predetermined speed of said motor, and capacitance means connected in shunt to said armature winding.

3. The method of regulating the speed of a commutator motor including an armature winding which includes segregating sections of said winding at relatively high speeds, and reuniting said sections at relatively low speeds.

KARL SCHWARZ.